No. 747,263. PATENTED DEC. 15, 1903.
H. C. STREITWIESER.
CORN HARVESTER.
APPLICATION FILED MAY 11, 1901.
NO MODEL.
4 SHEETS—SHEET 3.
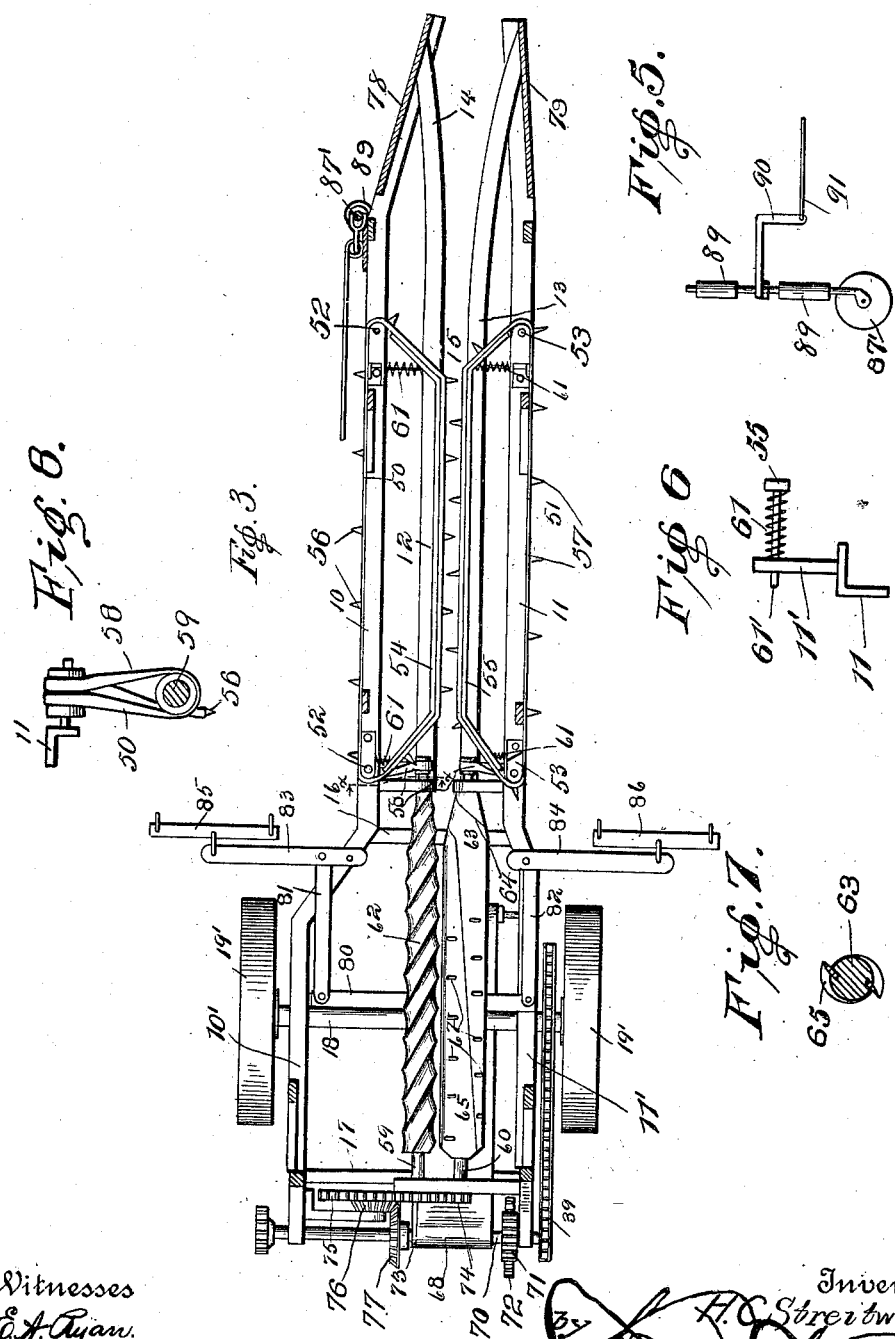
Witnesses
E. A. Ryan.
Harry Ellis Chandler.
Inventor
H. C. Streitwieser
Attorney No. 747,263. PATENTED DEC. 15, 1903.
H. C. STREITWIESER.
CORN HARVESTER.
APPLICATION FILED MAY 11, 1901.
NO MODEL. 4 SHEETS—SHEET 4.
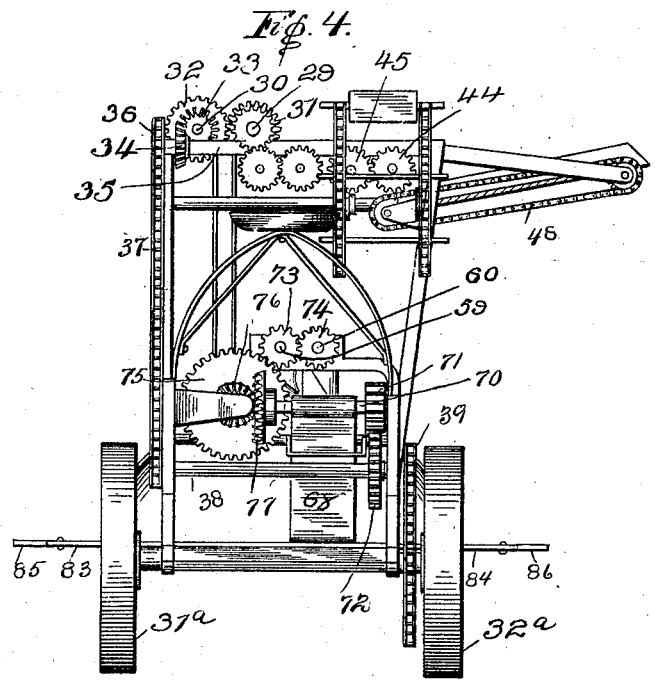

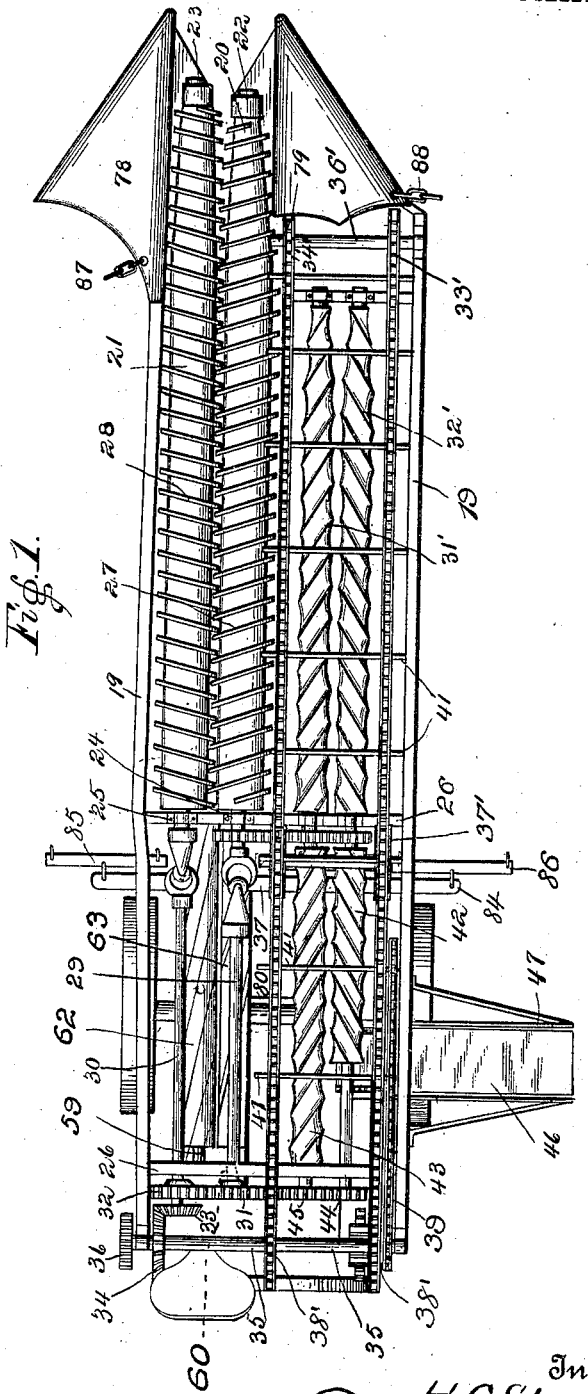

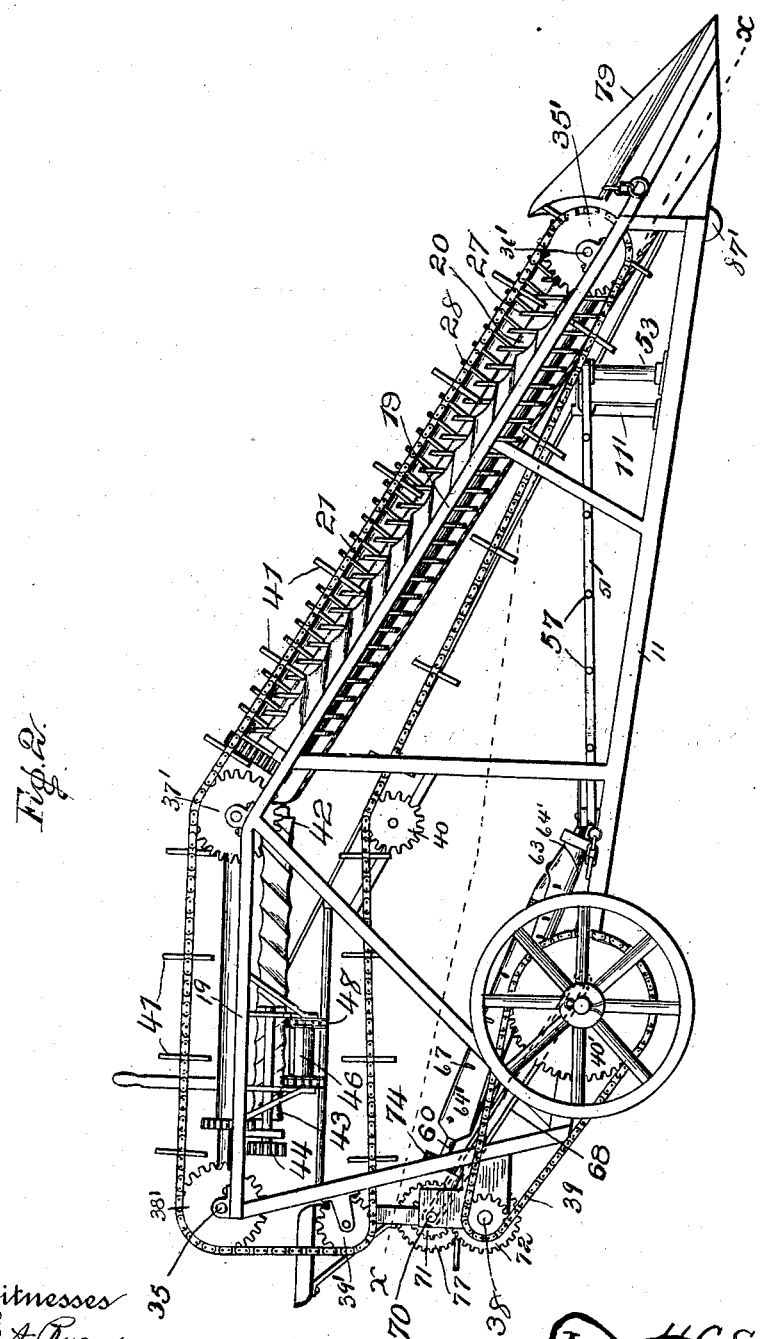

No. 747,263. Patented December 15, 1903.

UNITED STATES PATENT OFFICE.

HERMAN CHARLES STREITWIESER, OF PLATTSMOUTH, NEBRASKA.

CORN-HARVESTER.

SPECIFICATION forming part of Letters Patent No. 747,263, dated December 15, 1903.

Application filed May 11, 1901. Serial No. 59,880. (No model.)

*To all whom it may concern:*

Be it known that I, HERMAN CHARLES STREITWIESER, a citizen of the United States, residing at Plattsmouth, in the county of Cass, State of Nebraska, have invented certain new and useful Improvements in Corn-Harvesters; and I do hereby declare the following to be a full, clear, and exact description of the invention, such as will enable others skilled in the art to which it appertains to make and use the same.

This invention relates to corn-harvesters; and it has for its object to provide a machine or implement which may be drawn through a corn-field and which may be operated to first strip the corn of its ears, then cut off the stalk, and meanwhile operate upon the ears to remove the husks, and after the stalks are cut off to chop them into fodder or ensilage, the ensilage being discharged from the rear of the machine, while the husked ears are discharged laterally into a wagon or other receptacle.

In the drawings forming a portion of this specification, and in which like numerals of reference indicate similar parts in the several views, Figure 1 is a top plan view of the machine. Fig. 2 is a side elevation of the machine looking from the right. Fig. 3 is a sectional view on line *x x* of Fig. 2. Fig. 4 is a rear elevation of the machine with parts of the forward portion of the machine omitted for clearness. Fig. 5 is a detail elevation of one of the caster-wheels. Fig. 6 is a transverse section through a part of the front portion of the frame and showing the yieldable mounting of the presser-plate. Fig. 7 is a section of a chopper-roller. Fig. 8 is a section on line *x x* of Fig. 3.

Referring now to the drawings, the corn-harvester comprises a frame including outside sills 10 and 11, the rear portions of which are parallel, as shown at 10' and 11', and the rear portions of the inside sills 12 and 13. The forward portions of the outside sills converge forwardly, while the forward end portions of the inside sills diverge forwardly to form a throat 14, leading to a guideway 15, formed by the parallel portions of the inside sills, and which guideway terminates at the cross-bar 16, which is disposed transversely of the sills both inside and outside. Connected with the rear end portions 10' and 11' of the sills 10 and 11 is a cross-piece 17, and the inside sills have their rear ends fixed to this cross-piece. An axle 18, having supporting-wheel 19', is journaled in bearings in the sills, and these wheels are fixed to the shaft or axle, so as to positively rotate the latter to operate the mechanism.

Upon the platform is erected a frame, including side beams 19, which are taken forwardly over the platform and then downwardly and slantingly to the forward portions of the sill, and between these beams 19 are disposed two rollers 20 and 21, the forward ends of which are journaled in bearings 22 and 23 at the front end of the throat 14, while their upper ends are journaled in other bearings 24 and 25, sustained by the cross-piece 26, which is attached to the beams 19.

Upon the rollers 20 and 21 are formed helical flanges 27 and 28, which interlock at the inner sides of the rollers, the convolutions of the flanges converging upwardly of the rollers—that is, the roller 20 has its flange wound to the right, while the roller 21 has its flange wound to the left, so that if the rollers be rotated with their adjacent or inner faces outwardly an ear of corn placed between the rollers will be carried upwardly. The roller 20 is in a slightly-lower plane than the roller 21, so that there will be no tendency of an ear of corn to pass over the roller 21, and instead it will be carried over the roller 20 and discharged from the outer side thereof.

It will be noted that the forward ends of the rollers are tapered, so that the forward portions of the flanges thereof do not interlock, but are separated by slight interspaces. The reason for this is in order that the machine may be moved down a row of corn, and the stalks of corn will be engaged by the flanges and moved thereby rearwardly through the guideways.

To rotate the rollers 20 and 21, tumble-rods 29 and 30 are connected with their upper ends and are mounted in bearings upon the upper frame of the body of the machine, and at the rear ends of these rods are intermeshing gear-wheels 31 and 32, and upon the extremity of the rod 30 is a beveled pinion 33. Pinion 33 meshes with a beveled gear 34 on shaft 35, and this shaft has a sprocket 36, with which engages a chain 37, leading to a sprocket upon a counter-shaft 38, which in turn carries a sprocket having a chain 39 engaged therewith and with a sprocket 40 upon the axle of the machine. The rollers are thus driven from the ground-wheels. With this construction it will be seen that as the machine is advanced the stalk of corn will pass between the rollers and that the flanges of the rollers will act to strip the stalks of their ears, the ears falling over the roller 20. After the ears have been stripped from the stalks the husks must be removed therefrom, and for this purpose husking-rollers 31' and 32' are provided and are journaled in bearings upon the frame of the machine. These rollers, as shown, are helically grooved, and they are slanted to conform to the inclination of the rollers 20 and 21. These husking-rollers extend from a point in the rear of the forward ends of the stripping-rollers to the rear ends thereof and are rotated with their adjacent faces downwardly, so as to engage the husks and pull them from the ears. During this husking operation the ears are moved upwardly and longitudinally of the husking-rollers by means of a conveyer. This conveyer consists of chains 33' and 34', engaged with sprockets 35 upon a shaft 36 beyond the forward ends of the husking-rollers. Then the chains are taken upwardly and rearwardly and over sprockets 37' at the upper ends of the rollers, then rearwardly and over sprockets 38' at the rear end of the frame, then downwardly and under sprockets 39', then over sprockets 40, and finally returned to the sprockets 35'. Transversely of these chains are secured scraping-slats 41, which move over the faces of the husking-rollers and by engagement with the ears of corn move them upwardly and longitudinally of the husking-rollers. It will be noted that the upper portions of the chains run horizontally, and it will be seen that the ears of corn will be discharged from the upper ends of the husking-rollers by the slats of the conveyer as they pass to the horizontal positions.

When the ears of corn are discharged from the rollers 31' and 32', they fall onto a second set of husking-rollers 42 and 43, which are disposed horizontally and parallel and which are driven in the same directions with the corresponding rolls 31' and 32' by means of gears 44 and 45, carried thereby and intermeshing, the gear 45 meshing also with the gear 31 of the tumble-rod 29. Any husks that remain upon the ears after they are discharged from the first husking-rollers are removed by this second set of husking-rollers. The husking-roller 42 terminates somewhat short of the rear end of the husking-roller 43 and over a conveyer-apron 46, which passes outwardly and over a chute 47, and onto this apron the husked ears are finally dropped. The apron 46 is mounted on rollers having sprocket-wheels with which are engaged chains 48, and which sprockets are rotated in any suitable manner to operate the apron.

As above described, the flanges 27 and 28 move the upper portions of the stalks rearwardly, and in order to positively move the lower portions thereof belts or chains 50 and 51 are provided and are disposed upon guide-rollers 52 and 53, the adjacent sides of these belts running over guide-plates 54 and 55, which are disposed parallel and above the sills 12 and 13. The belts have fingers 56 and 57, which engage behind the stalks, so as to move them rearwardly down the guideway. To move the belts, the rear guide-rollers 52 and 53 have driving-belts 58 engaged therewith and engaged with pulleys upon the forward ends of rearwardly and upwardly directed shafts 59 and 60, having bearings upon the inner sills 12 and 13 and the rear end of the frame of the machine. The parallel plates 54 and 55 are pressed toward each other by helical springs 61, disposed upon pins 61', which are slidably engaged with the outside sills 10 and 11 or supports 11', carried thereby.

The shafts 59 and 60 carry two rollers 62 and 63, the forward end of the roller 63 having a helical cutting-knife 64 of very low pitch and which moves in close relation to the roller 62, and the fingers 56 and 57 move the cornstalks up to this knife, so that they may be cut off by it. The roller 63 also carries additional knives 65, arranged with an extremely steep pitch and almost longitudinally of the roller, while the roller 62 is in the form of a twisted rectangular bar the edges of which form cutting-knives. These two rollers are rotated with their mutually adjacent faces downwardly, and thus after a cornstalk is cut off it is drawn downward between the rollers and is chopped up by these coöperating knives. The roller 63 is furthermore provided with projections 67, which act to tear or shred the cornstalk, so that they are finely divided. After the finely-divided cornstalks drop from the knives they fall upon an apron 68, mounted upon suitable supporting-rollers, one of which is carried by a shaft 70, having a pinion 71 meshing with a gear-wheel 72 on shaft 38. To rotate the rollers 62 and 63, the shafts 59 and 60 have intermeshing pinions 73 and 74, and the pinion 73 meshes with a gear 75 upon a shaft, which carries a bevel-pinion 76, meshing with a beveled gear 77 on shaft 70. By this means the cornstalks after being chopped up are discharged from the rear end of the machine, and if the stalks are green they may be collected or caught in a receiver to make fodder, while if they are dry they may be discharged upon the ground as a fertilizer.

To raise fallen corn so that it will stand erect when entering the throat, wings 78 and 79 are formed upon the forward ends of the sills and are in the forms of sections of cones, as illustrated.

The draft-animals are hitched at opposite sides of the machine, and for this purpose a cross-beam 80 is pivoted upon the platform of the machine, and connected therewith are links 81 and 82, to which in turn are pivoted levers 83 and 84, the fulcrums of which are upon the platform of the machine. At the outer ends of the levers 83 and 84 are connected swingletrees 85 and 86. The draft-animals are connected with the swingletrees, and connected with the guards 78 and 79 are chains 87 and 88, which correspond to the ordinary pole-chains. The machine of course turns upon the supporting-wheels 19' from side to side, and by connecting these chains with the collars of the draft-animals the front of the machine is easily swung laterally. To facilitate lateral swinging movement of the front end of the machine, a caster-wheel 87' is journaled in spaced vertical bearings 89 on the side of the forward portion of the machine, and with the stem of this caster-wheel is connected a bell-crank lever 90, having a rod or table 91 leading to a hand-lever upon the machine. When this lever 90 is rocked, the caster-wheel is moved downwardly and the front end of the machine is raised, it being understood that normally the front end of the machine runs on shoes, and the mechanism is so balanced that the machine runs easily over the earth.

It will be understood that while a single caster is shown at the front end of the machine a caster may be used at the opposite side of the machine also, and, furthermore, the counter-shaft operated from the ground-wheel may be provided with a ratchet mechanism of common form to prevent reverse movement of the mechanism when turning. Also it will be understood that while the present machine is shown as adapted for cutting a single row of corn the snouts and elevating mechanisms may be duplicated to adapt the machine to a number of rows.

It will be noted that the draft-animals are hitched on both sides of the machine, while the front part thereof extends ahead of the animals, so that the corn is operated upon initially in advance of the animal and then is discharged in the rear, so that the animals do not walk upon it. As it is desirable to elevate the stalks with greater rapidity at the initial engagement of the screws therewith, the pitch of the screws at their ends may be greater than at the central portions.

What is claimed is—

1. A harvester comprising inclined stripping-rollers, cutting-off knives below and beyond the rear ends of the stripping-rollers, stalk-feeding belts disposed below the stripping-rollers and disposed to engage the stalks and hold them in upright position until engaged by the cutting-off knives, husking-rollers disposed to receive from the stripping-rollers at one side of the latter, a conveyer for moving the ears longitudinally of the husking-rollers, a chute disposed to receive from the husking-rollers, a chopping and shredding mechanism in the rear of the cutting-off knives, a conveyer disposed to receive from the chopping and shredding mechanism, drive-wheels for the harvester and connections between the drive-wheels and the rollers and conveyers for operating the latter.

2. In a corn-harvester, the combination with inclined stripping-rollers adapted to strip the ears from the stalks and to discharge them laterally, of inclined husking-rollers disposed at one side of the stripping-rollers to receive therefrom, additional and horizontal husking-rollers at the upper ends of the inclined husking-rollers, a conveyer for moving the ears longitudinally of the first husking-rollers and onto the second husking-rollers, one of the second husking-rollers terminating short of the rear end of the adjacent roller, and a discharge-conveyer disposed to receive from the end of the shorter roller.

3. In a corn-harvester, the combination with inclined stripping-rollers having helical flanges to strip the ears from the stalks and to discharge them from the rollers, of belts below the rollers and having fingers for engaging and feeding the stalks, and spring-pressed plates disposed to hold the belts yieldingly against the stalks to insure engagement of the fingers.

4. In a corn-harvester, the combination with a frame and supporting-wheels, the frame having shoes to normally support the forward portion of the frame, of an angular lever pivoted to the frame, a caster-wheel mounted at one end of the angular lever and means connected with the opposite end of the angular lever for rocking it with the caster into contact with the ground to raise the frame.

In testimony whereof I hereunto sign my name, in the presence of two subscribing witnesses, on the 3d day of May, 1901.

HERMAN CHARLES STREITWIESER.

Witnesses:
J. P. FULTER,
PHILIP THIEROLF.